United States Patent [19]
Van Vleck

[11] Patent Number: 5,387,465
[45] Date of Patent: Feb. 7, 1995

[54] PAPER ADHESIVE RELEASE SYSTEM

[75] Inventor: Gordon T. Van Vleck, Troy, N.Y.

[73] Assignee: General Electric Company, Waterford, N.Y.

[21] Appl. No.: 922,280

[22] Filed: Jul. 30, 1992

[51] Int. Cl.$^6$ .......................... B32B 7/06; B32B 7/12
[52] U.S. Cl. ................................. 428/352; 428/343; 428/353; 428/354; 428/447; 428/448; 428/451; 428/452; 428/537.5
[58] Field of Search .................... 428/537.5, 211, 447, 428/451, 343, 352, 354, 353, 452, 448

[56] References Cited

U.S. PATENT DOCUMENTS

| | | | |
|---|---|---|---|
| 3,816,282 | 6/1974 | Viventi | 204/159 |
| 4,026,705 | 5/1977 | Crivello et al. | 96/27 R |
| 4,052,529 | 10/1977 | Bokerman et al. | 428/537 |
| 4,070,526 | 1/1978 | Colquhoun et al. | 428/537 |
| 4,279,717 | 7/1981 | Eckberg et al. | 204/159 |
| 4,313,988 | 2/1982 | Koshar et al. | 428/40 |
| 4,370,358 | 1/1983 | Hayes et al. | 427/54.1 |
| 4,421,904 | 12/1983 | Eckberg et al. | 528/27 |
| 4,526,953 | 7/1985 | Dallavia, Jr. | 528/15 |
| 4,547,431 | 10/1985 | Eckberg | 428/413 |
| 4,558,082 | 12/1985 | Eckberg | 524/104 |
| 4,559,396 | 12/1985 | Sasaki et al. | 528/15 |
| 4,576,999 | 3/1986 | Eckberg | 525/476 |
| 4,584,355 | 4/1986 | Blizzard et al. | 525/477 |
| 4,585,836 | 4/1986 | Homan et al. | 525/477 |
| 4,591,622 | 5/1986 | Blizzard et al. | 525/477 |
| 4,640,967 | 2/1987 | Eckberg | 528/26 |
| 4,977,198 | 12/1990 | Eckberg | 522/25 |
| 5,139,815 | 8/1992 | Patterson | 427/515 |

FOREIGN PATENT DOCUMENTS 0089279 9/1983 European Pat. Off. .
9203233 3/1992 WIPO .

*Primary Examiner*—D. S. Nakarani

[57] ABSTRACT

The aged release stability of epoxy-functional UV-curable polysiloxane release coating compositions on various substrates is enhanced by treating the substrate with a weak acid, such as acetic acid.

2 Claims, No Drawings

PAPER ADHESIVE RELEASE SYSTEM

The present invention relates to silicone release coatings. More particularly, the present invention relates to epoxy functional ultraviolet (UV) radiation-curable polysiloxane release coatings. Most particularly, the present invention relates to a method for improving the aging stability of epoxy-functional UV-curable polysiloxane release coatings.

BACKGROUND OF THE PRESENT INVENTION

Silicone compositions have become widely accepted as release coatings, which are useful to provide a surface or material which is relatively nonadherent to other materials which would normally adhere closely thereto. Silicone release compositions may be used as coatings which release pressure sensitive adhesives for labels, decorative laminates, transfer tapes, etc. Silicone release coatings on paper, polyethylene, Mylar® and other such substrates are also useful to provide nonstick surfaces for food handling and industrial packaging.

Silicone release compositions are generally either heat-curable or UV-curable. The ultraviolet (UV) curable compositions have become more commercially acceptable for various applications due in part to the high energy costs and strict environmental regulations on solvent emissions which are attendant with the heat-curable compositions. Ultraviolet radiation is one of the most widely used types of radiation because of its low cost, ease of maintenance, and low potential hazard to industrial users. Typical curing times are much shorter, and heat-sensitive substrates can be safely coated and cured under UV radiation whereas thermal energy might damage the substrate.

Several UV-curable silicone systems are known in the art, including, Viventi, U.S. Pat. No. 3,816,282, Bokerman et al., U.S. Pat. No. 4,052,059 and Colquhoun et al., U.S. Pat. No. 4,070,526. These patents describe compositions where ω-mercaptoalkyl substituted polysiloxanes react with vinyl-functional siloxanes when exposed to UV radiation in the presence of certain photosensitizers.

UV-curable silicone resins with epoxy or acrylic functionality are also known in the art. These resins are found to have the degree of activity necessary to make them especially suitable for release applications. Illustrative of these compositions are Eckberg et al., U.S. Pat. No., 4,279,717; and Crivello et al., U.S. Pat. No. 4,026,705, as well as others.

It has been found that while these compositions give excellent stable aged release properties in most applications, there still exists room for improvement in employing the silicone release compositions on kraft paper and machine refined paper substrates. It would therefore represent a notable advance in the state of the art if a novel silicone release composition could be developed which provided further improvements of stable aged release properties on these substrates.

To this end, the present applicant has now found that if the substrate, such as kraft paper, is treated with a weak acid, improved aged release properties are obtained.

SUMMARY OF THE PRESENT INVENTION

According to the present invention there is provided a method of improving the age releasing properties of a silicone release composition comprising applying an effective amount of a weak acid to a substrate.

Also according to the present invention there is provided a novel adhesive release composition comprising a silicone release composition, an adhesive and an effective amount of a weak acid.

Still further, according to the present invention there is provided a novel adhesive release system comprising a substrate, an effective amount of a weak acid applied to the substrate, a silicone release composition and an adhesive.

In preferred embodiments, the substrate is a Kraft paper, the weak acid is acetic acid, the silicone release composition comprises an ultra-violet light curable epoxy silicone and the adhesive is an acrylic adhesive.

DETAILED DESCRIPTION OF THE PRESENT INVENTION

The silicone release compositions useful in the practice of the present invention are UV radiation curable compositions and are well known in the art and described in the patent literature, for example, Eckberg et al., U.S. Pat. No., 4,279,717; Crivello et al., U.S. Pat. No. 4,026,705; Eckberg et al., U.S. Pat. No. 4,421,904; Eckberg, U.S. Pat. No. 4,547,431; Eckberg, U.S. Pat. No. 4,576,999; Eckberg, U.S. Pat. No. 4,640,967; Hayes et al., U.S. Patent No. 4,370,358; Eckberg, U.S. Pat. No. 4,558,082; and Eckberg, U.S. Pat. No. 4,977,198.

These silicone release compositions generally comprise a catalytic amount of a photocatalyst and an epoxy functional organopolysiloxane.

Particularly suitable for use with the present invention is a silicone release composition comprising a catalytic amount of an onium salt photocatalyst and an epoxy functional organopolysiloxane comprising in sufficient number to crosslink and cure the composition units of the formula:

$$R_a R^1_b SiO_{(4-a-b)/2}$$

wherein R is hydrogen, $C_{(1-8)}$ alkyl, or aryl, $R^1$ is a monovalent epoxy functional organic radical of from 2 to 20 carbon atoms, a is 0, 1 or 2; b is 1, 2 or 3; and a+b is 1, 2 or 3.

The epoxy functional organopolysiloxanes are easily and simply manufactured. By one method they are produced by reacting organopolysiloxane hydrides with unsaturated epoxy monomers in the presence of a platinum catalyst. The hydride may be present in the organopolysiloxane as $H_2SiO_{2/2}$ units, $HSiO_{3/2}$ units, $(CH_3)_2HSiO_{\frac{1}{2}}$ units, and/or preferably $(CH_3)HSiO_{2/2}$ units. The number of hydrides will determine the maximum number of epoxy functions present since the hydride will react with the unsaturation of the epoxy monomer and be replaced thereby.

Suitable unsaturated epoxy groups for use herein include vinyl or allylic functional epoxy compounds containing olefinic moieties such as allylglycidylether, glycidyl acrylate, vinyl norbornene monoxide, dicyclopentadiene monoxide and 4-vinylcyclohexeneoxide. Cyclohexenoxide compounds are preferred. Epoxy functional organopolysiloxanes and the production thereof are taught in U.S. Pat. Nos. 4,576,999 and 4,279,717.

The epoxy functional organopolysiloxane should have from about 2% to about 40% by number units with epoxy functions based on total silicone units, and preferably from about 3 to 25% by number. It is also contemplated that the epoxy functional organopolysiloxane be modified by modifying the epoxy functionalities by an epoxy esterification reaction with HOOC—$R^3$ where $R^3$ is a $C_{1-20}$ substituted or unsubstituted hydrocarbon radical. Generally from about 5% to about 60% by number of the epoxy functions and preferably from about 10% to 35% should be modified by such modifying reaction. Such a modifying reaction is described more fully in U.S. Pat. No. 4,977,198.

The epoxy functional organopolysiloxane may be blended or compounded with optional substances as desired. Fillers, pigments, crosslinking agents or promoters, catalysts, UV absorbers etc. will all find utility in compositions containing epoxy functional organopolysiloxanes.

The photocatalysts useful in the practice of the present invention, particularly for use with epoxy functional materials are onium salt photocatalysts. Generally, the onium salt photocatalyst can be divided into three classes, namely the halonium photocatalysts, the sulfonium photocatalysts and the phosphonium photocatalysts.

The halonium salts are represented by the general formula:

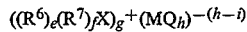

where $R^6$ is a monovalent aromatic organic radical; $R^7$ is the same or a different monovalent aromatic organic radical; X is a halogen, such as I, Br, Cl, etc.; M is a metal or a metalloid; Q is a halogen radical, such as Cl F, Br, I, etc.; e is a whole number equal to 0, 1 or 2; f is a whole number equal to 0, 1 or 2; e+f=2; g=h−i; i is the valence of M and is an integer from 2 to 7 inclusive; and h is greater than i and has a value up to and including 8. Preferred halonium salts are iodonium salts and are exemplified by 3-methoxyphenylphenyl-$I^+BF_4^-$, 2-nitrophenyl-phenyl-$I^+BF_4^-$, etc. The halonium salts are well known and are discussed further in U.S. Pat. Nos. 4,026,705 and 3,981,897.

Similarly, the sulfonium salts are represented by the general formula:

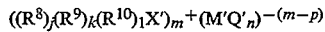

where $R^8$ is a monovalent organic aliphatic radical selected from alkyl, cycloalkyl, and substituted alkyl; $R^{20}$ is a polyvalent organic radical forming a heterocyclic or fused ring structure selected from aliphatic radicals and aromatic radicals; X' is a group VIa element selected from sulfur, selenium and tellurium; M' is a metal or metalloid; Q' is a halogen radical, j is a whole number of 0, 1, 2 or 3; k is a whole number of 0, 1 or 2; l is a whole number of 0 or 1; j+k+l=3 or the valence of X; m=n−p; p is the valence of M' and is an integer of from 2 to 7 inclusive; and n is greater than p and is an integer having a value up to 8. Consistent with the name given herein, it is preferred that X' be sulfur. Suitable sulfonium salts include triphenyl-$S^+SbF_6^-$, 4-thiophenoxyphenyl-di-phenyl-$S^+SbF_6^-$, tricyclodiphenylenephenyl-$S^+BF_4^-$, benzoylmethyl-cyclo-butylene-$S^+PF_6^-$. Further sulfonium salts are disclosed in U.S. Pat. No. 4,161,478.

The phosphonium salts may be represented by the formula:

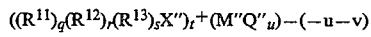

where $R^{11}$ is a monovalent aromatic organic radical selected from carbocyclic radicals and heterocyclic radicals; $R^{12}$ is a monovalent organic aliphatic radical selected from alkyl, alkoxy, cycloalkyl and substituted derivatives thereof; $R^{13}$ is a polyvalent organic radical forming an aromatic heterocyclic or fused ring structure with X''; X'' is a group Va element selected from N, P, As, Sb, and Bi; M'' is a metal or metalloid, Q'' is a halogen radical; q is a whole number equal to 0 to 4 inclusive; r is a whole number equal to 0 to 2 inclusive; s is a whole number equal to 0 to 2 inclusive. q+r+s is a value equal to 4 or the valence of X''; t=u−v; v is the valence of M'' and is an integer of from 2 to 7 inclusive; and u is greater than v and is an integer having a value up to 8. X'' is preferably phosphorus as understood from the term phosphonium salt. Phosphonium salts are represented by, for example, tetraphenyl-$P^+BF_4^+$, triphenyl-benzoylmethyl-$P^+AsF_6^-$, dimethyl-phenylbenzoylmethyl-$N^+BF_4^-$. Phosphonium salts are further described in U.S. Pat. No. 4,069,055.

Dye photosensitizers may also be added to the silicone release compositions of the present invention. These are generally added to increase the effectiveness of the photocatalyst and are understood to generally function by absorbing light of a spectrum which has little or no effect on the catalyst and releasing the absorbed light in a form to affect the photocatalyst. Thus, the use of the dye photosensitizer results in better utilization of the energy available from the light source. Dyes which can be used in combination with the above described onium salts are cationic dyes, such as shown in Vol. 20, p. 194-97 of the Kirk-Othmer Encyclopedia, 2nd Edition, 1965, John Wiley & Sons, New York. Some of the cationic dyes which can be used are, for example, Acridine orange; C.I. 46005;
Acridine yellow; C.I. 46035;
Phosphine R; C.I. 46045;
Benzoflavin; C.I. 46065;
Setoflavin T; C.I. 49005.

In addition to the above, basic dyes can also be used as photosensitizers. Some of these basic dyes are shown in Vol. 7, p. 532-34 of Kirk-Othmer Encyclopedia, as cited above, and include:

Hematoporphyrin;
4,4'-bisdimethylaminobenzophenone and
4,4'-bisdiethylaminobenzophenone.

Also, suitable are xanthones, such as thioxanthone, 2-isopropyl thioxanthone, and aminoxanthene, as described in Eckberg et al., U.S. patent application Ser. No. 07/710,266, filed Jun. 4, 1991. Specific instances where dye photosensitizers are employed are also detailed in U.S. Pat. No. 4,026,705.

Epoxy functional organic compounds which are miscible with epoxysilicones may also commonly be utilized in the epoxy functional organopolysiloxanes and onium salt photocatalyst compositions of the instant invention to modify cure performance and adhesion. These epoxy functional organic compounds include limoneneoxide, 4-vinylcyclohexeneoxide, allyl glycidyl ether, 7-epoxy-1-octene, vinylcyclohexenedioxide, bis(2,3-epoxycyclopentyl)ether, 3,4-epoxycyclohexylmethyl-3,4-cyclohexanecarboxylate, cresylglycidyl ether, butanedioldiglycidyl ether and the like. Mixtures of such epoxides are also suitable. These compounds may also be useful as reactive diluents.

The silicone release compositions are conveniently prepared into UV-curable compositions by simply mixing epoxy functional organopolysiloxanes with the onium salt photocatalyst and other ingredients as the skill in the art dictates. There is generally required from about 0.1% to about 15% by weight of an onium photocatalyst based on the weight of curable composition. Of the dye photosensitizers there may be employed any effective amount but generally from about 0.01% to about 1.5% by weight, again based on the total curable composition. The epoxy functional organic compound where employed is generally present in an amount of from about 1% to about 50% and preferably from about 2% to about 20% by weight based on the epoxy functional organopolysiloxane present.

A curable silicone coating useful in the practice of the present invention may comprise about 100 parts by weight epoxy functional organopolysiloxane which is linear with a viscosity of from about 10 to about 500,000 centipoise at 25° C.; optionally from about 1 to about 100 parts by weight of a reinforcing or extending filler, optionally from about 1 to about 50 parts by weight of an epoxy functional organic compound; from about 0.1 to about 15% by weight based on total composition an onium salt photocatalyst; and from about 0.01 to about 1.5% by weight of a dye photosensitizer based on total composition.

The silicone release compositions are known to be employed to form coatings for pressure sensitive adhesives which may use a wide variety of adhesives. In preferred embodiments the adhesives for use in the practice of the present invention are acrylic adhesives, although rubbery and-other adhesives known to those skilled in the art mabe used. These adhesives are available commercially and include but are not limited to, for example, GELVA ® 263 self crosslinking adhesive available from Monsanto, Inc., and Ashland ® 1085 available from Ashland Chemicals, Inc.

In the prior art, the silicone release coating compositions and the pressure sensitive adhesives were applied directly to a substrate by methods known to those skilled in the art, such as by coating, spraying, brushing and application by blade or gravure processes. Typical substrates included, but were not limited to, glass, metal, paper, polyethylene coated kraft (PEK) paper, super-calendered kraft (SCK) paper, machined finished paper, polyethylene films, polypropylene films, polyester films and the like.

The present applicant has now found that by pretreating the substrate with a weak acid, improved aged release stability of the adhesive is obtained. Accordingly, essential to the practice of the present invention is the use of a weak acid. A weak acid, as used hereinabove and throughout the instant specification, is an acid having a pKa of $10^{-3}$ or below. Also contemplated for use herein are acids having a pKa of $10^{-5}$ or below.

Exemplary of acids useful in the practice of the present invention are saturated and unsaturated carboxylic acids, such as formic, acetic, acrylic, methacrylic, butyric, valeric, hexanoic, heptanoic, octanoic, palmitic, stearic, oleic, linoleic, halo- or cyano-substituted carboxylic acids such as chloroacetic acid or cyanoacetic acid, and aromatic acids such as benzoic acid or naphthoic acids and the corresponding halo or cyano or nitro substituted aromatic acids. Also useful are carbonic acid, phosphoric acid, boric acid and the like. Most preferred is acetic acid.

The acid, such as acetic acid, can be applied in any effective amount to the substrate by methods known to those of ordinary skill in the art. Typically a coating of a solution containing from about 1 to about 50% by weight acid is added, preferably from about 5 to about 25% by weight acid and most preferably from about 5 to about 10% by weight acid. Generally, a relatively thin and continuous coating is applied to the substrate, such as by means of a wire rod.

It is believed, although the inventor does not wish to be bound by any theory, that the weak acid simultaneously catalyzes the acid-triggered cure reaction of the silicone release composition and the rate of the cure reaction. The increased rate of cure is thought to be caused since the acid on the paper sets up a weak acid surface which catalyzes the reaction of the silicone composition. Without the acid present, the reaction must start first and generate acid to drive the reaction to completion. This increase in rate of cure prevents penetration of the silicone into the porous paper surface. The weak acid also neutralizes materials on the surface which might retard the cure of the compositions.

DESCRIPTION OF THE PREFERRED EMBODIMENTS

The following examples illustrate the present invention. They are not to be construed to limit the scope of the appended claims in any manner whatsoever.

EXAMPLES 1-3

Solutions of 1%, 5% and 10% acetic acid are prepared. These solutions are then respectively coated on SCK paper with a #5 Meyer rod and cured in a forced air oven for 20 seconds at 300° F. The acid coated SCK paper is then further coated with an epoxy functional silicone release composition comprising UV9300 epoxysilicone polymer and UV9310c photocatalyst, available from General Electric Company, using a Euclid Tool & Machine Co. Laboratory Coater at 100% solids to coat a continuous, defect free silicone coating of about 1.2 g/m² at 100% solids, and cured in an RPC model 1202 AN Lab UV processor equipped with 2 Hanovia 200 watt/inch UV lamps at 100 feet per minute. These sheets are then coated with a coating weight of 15 lbs/ream (3000 ft²) of GELVA ® 263 acrylic adhesive by a laboratory 2 roll coater with feeler gauges and laminates are prepared therefrom by setting a sheet of paper facestock on the adhesive.

For comparison purposes, a non-acid treated sheet of SCK paper, a sheet of parchment and non-acid coated sheets coated with UV 9300 and UV 9310c on a commercial coater at Black Clawson, Fulton, NY are also prepared.

These sheets are tested for release values at different aging periods as the laminates aged at 25° C. The release values represent the amount of force necessary to separate the facestock or substrate containing the adhesive from the release liner or silicone coated substrate, for 2 inch wide laminates pulled at 400 inch/minute at a 180° angle.

The results are set forth in Table 1 below.

TABLE 1

| Example | A* | B* | C* | 1[a] | 2[b] | 3[c] |
|---|---|---|---|---|---|---|
| Release data, g/in² | | | | | | |
| Initial same day release | 45 | 65 | 15 | 25 | 25 | 25 |
| 1 Day | 65 | 75 | 15 | 25 | 25 | 25 |
| 3 Day | 125 | 115 | 15 | 30 | 30 | 25 |

TABLE 1-continued

| Example | A* | B* | C* | 1$^a$ | 2$^b$ | 3$^c$ |
|---|---|---|---|---|---|---|
| 10 Day | 140 | 170 | 20 | 40 | 40 | 40 |

*Comparative Example
A = Untreated paper
B = Non-acid treated paper
C = Parchment
$^a$1% Acetic Acid treated
$^b$5% Acetic Acid treated
$^c$10% Acetic Acid treated banks of focused Fusion Systems 375 watt/inch microwave-fired mercury vapor H lamps. The samples were then tested and the laminates were aged against the Gelva®263 solvent acrylic adhesive at 70° C. (Table 2) and at 25° C. (Table 3), the Ashland® 1085 solvent acrylic adhesive at 25° C. (Table 4) and at 70° C. (Table 5) and the Flexacryl® 1625 emulsion acrylic adhesive at 25° C. (Table 6). The release data from these tests is set forth below in Tables 2–6 along with comparative data.

TABLE 2

| | Gelva® 263 at 70° C. | | | | | | | | | | |
|---|---|---|---|---|---|---|---|---|---|---|---|
| | 4A* | 4 | 5A* | 5 | 6A* | 6 | 7A* | 7 | 8 | 9 | 10 | 11 |
| % Acetic Acid | 0 | 5 | 0 | 5 | 0 | 5 | 0 | 5 | 10 | 10 | 10 | 10 |
| Line Speed | 200 | 200 | 200 | 200 | 400 | 400 | 400 | 400 | 200 | 200 | 400 | 400 |
| Coat Weight | 0.78 | 0.89 | 1.06 | 1.0 | 1.0 | 0.80 | 0.75 | 1.0 | 0.80 | 0.97 | 0.76 | 1.04 |
| Release data, g/in$^2$ | | | | | | | | | | | | |
| Initial at 25° C. | 65 | 50 | 40 | 35 | 35 | 55 | 65 | 35 | 50 | 35 | 50 | 35 |
| 3 day at 70° C. | >500 | 180 | 340 | 70 | 340 | 250 | >500 | 70 | 140 | 60 | 230 | 70 |
| 1 week at 70° C. | >500 | 120 | 300 | 40 | 350 | 180 | >500 | 40 | 80 | 40 | 160 | 50 |
| 2 weeks at 70° C. | >500 | 190 | >500 | 50 | >500 | 280 | >500 | 40 | 100 | 40 | 180 | 60 |

*Comparative Example

TABLE 3

| | Gelva® 263 at 25° C. | | | | | | | | | | |
|---|---|---|---|---|---|---|---|---|---|---|---|
| | 12A* | 12 | 13A* | 13 | 14A* | 14 | 15A* | 15 | 16 | 17 | 18 | 19 |
| % Acetic Acid | 0 | 5 | 0 | 5 | 0 | 5 | 0 | 5 | 10 | 10 | 10 | 10 |
| Line Speed | 200 | 200 | 200 | 200 | 400 | 400 | 400 | 400 | 200 | 200 | 400 | 400 |
| Coat Weight | 0.76 | 0.89 | 1.06 | 1.0 | 1.0 | 0.80 | 0.75 | 1.0 | 0.80 | 0.97 | 0.76 | 1.04 |
| Release Data, g/in$^2$ | | | | | | | | | | | | |
| Initial at 25° C. | 110 | 85 | 60 | 60 | 50 | 95 | 90 | 55 | 85 | 55 | 100 | 50 |
| 1 week at 70° C. | 500 | 90 | 130 | 50 | 120 | 120 | >500 | 40 | 70 | 40 | 100 | 40 |
| 2 weeks at 70° C. | 500 | 70 | 150 | 40 | 150 | 120 | >500 | 40 | 60 | 60 | 100 | 40 |

*Comparative Example

TABLE 4

| | Ashland® 1085 at 70° C. | | | | | | | | | | |
|---|---|---|---|---|---|---|---|---|---|---|---|
| Example | 20A* | 20 | 21A* | 21 | 22A* | 22 | 23A* | 23 | 24 | 25 | 26 | 27 |
| % Acetic Acid | 0 | 5 | 0 | 5 | 0 | 5 | 0 | 5 | 10 | 10 | 10 | 10 |
| Line Speed | 200 | 200 | 200 | 200 | 400 | 400 | 400 | 400 | 200 | 200 | 400 | 400 |
| Coat Weight | 0.78 | 0.89 | 1.06 | 1.0 | 1.0 | 0.80 | 0.75 | 1.0 | 0.80 | 0.97 | 0.76 | 1.04 |
| Release Data, g/in$^2$ | | | | | | | | | | | | |
| Initial at 25° C. | 90 | 75 | 60 | 50 | 55 | 75 | 85 | 45 | 80 | 55 | 80 | 60 |
| 1 week at 25° C. | >250 | 90 | 100 | 60 | 90 | 90 | 240 | 45 | 85 | 60 | 90 | 60 |
| 2 weeks at 25° C. | 470 | 80 | 100 | 50 | 100 | 70 | 375 | 40 | 75 | 50 | 75 | 55 |

From the data in Table 1 above, it can be seen that the acetic acid treated SCK paper provides significantly better aged release stability than untreated paper.

EXAMPLES 4–37

5 and 10% acetic acid was coated by a Meyer rod onto #42 SCK paper from Otis Specialty Papers. The coated paper was in turn coated with UV9300/3% UV9310c silicone release system at 200 and 400 feet per minute at two different silicone weights by means of a 3 roll offset gravure coating machine at Black Clawson Machine Co. Cure was then effected by exposure to 2

TABLE 5

| | Ashland® 1085 at 25° C. | | | |
|---|---|---|---|---|
| Example | 28A* | 28 | 29A* | 29 |
| Acetic Acid | 0 | 5 | 0 | 5 |
| Line Speed | 200 | 200 | 400 | 200 |
| Coat Weight | 0.78 | 0.89 | 1.0 | 1.0 |
| Release Data, g/in$^2$ | | | | |
| Initial at 25° C. | 80 | 80 | 50 | 60 |
| 1 day at 70° C. | 450 | 100 | 130 | 70 |
| 1 week at 70° C. | >500 | 220 | >500 | 120 |

*Comparative Example

TABLE 6

| | Flexacryl® 1625 Emulsion Acrylic at 25° C. | | | | | | | | | | |
|---|---|---|---|---|---|---|---|---|---|---|---|
| Example | 30A* | 30 | 31A* | 31 | 32A* | 32 | 33A* | 33 | 34 | 35 | 36 | 37 |
| % Acetic Acid | 0 | 5 | 0 | 5 | 0 | 5 | 0 | 5 | 10 | 10 | 10 | 10 |

TABLE 6-continued

| | Flexacryl ® 1625 Emulsion Acrylic at 25° C. | | | | | | | | | | | |
|---|---|---|---|---|---|---|---|---|---|---|---|---|
| Example | 30A* | 30 | 31A* | 31 | 32A* | 32 | 33A* | 33 | 34 | 35 | 36 | 37 |
| Line Speed | 200 | 200 | 200 | 200 | 400 | 400 | 400 | 400 | 200 | 200 | 400 | 400 |
| Coat Weight | 0.78 | 0.89 | 1.06 | 1.0 | 1.0 | 0.80 | 0.75 | 1.0 | 0.00 | 0.97 | 0.76 | 1.04 |
| Release Data, g/in² | | | | | | | | | | | | |
| Initial at 25° C. | 200 | 195 | 110 | 100 | 100 | 250 | 155 | 125 | 190 | 110 | 225 | 125 |
| 1 week at 25° C. | 240 | 200 | 120 | 120 | 120 | 240 | 200 | 125 | 190 | 130 | 225 | 135 |
| 2 weeks at 25° C. | 230 | 180 | 120 | 110 | 110 | 200 | 180 | 110 | 160 | 100 | 170 | 110 |

From the data above it can be seen that all of the samples with the untreated paper had unstable release values regardless of the type of the adhesive, coating line speed or silicone coat weights. However, stable release values were obtained when the paper was treated with acetic acid, in accordance with the appended claims.

COMPARATIVE EXAMPLES 38A* AND 39A*

The procedure of Example 1 was repeated except that 1% and 5% aqueous solutions of hydrochloric acid was substituted for acetic acid. After drying the hydrochloric acid coated paper, the paper turned color and became brittle to the point it was unusable as a silicone liner. Therefore no silicone adhesive was applied and tested for aging. It can therefore be seen that adhesive systems employing acids outside the scope of the present invention do not provide the significant improvements in aged release stability of the adhesive systems of the present invention.

The above-mentioned patents are all hereby incorporated by reference.

Many variations of the present invention will suggest themselves to those of ordinary skill in the art in light of the above-detailed description. For example, adhesives other than acrylic adhesives may be employed. Further, other weak acids such as boric acid, benzoic acid, formic acid, acrylic acid, palmalic acid, oleic acid and the like may be used instead of acetic acid. Still further the invention may be practiced on other substrates, including but not limited to PEK paper, machine finished paper and films such as polyethylene films. All such obvious modifications are within the full intended scope of the appended claims.

I claim:

1. An adhesive release system comprising a paper substrate, a continuous coating of a weak acid having a pKa $10^{-3}$ or below selected from the group consisting of saturated carboxylic acids, unsaturated carboxylic acids, halo-substituted carboxylic acids, cyano substituted carboxylic acids, unsubstituted aromatic acids, substituted aromatic acids, carbonic acid, phosphoric acid and boric acid applied to said substrate, a silicone release coating formed from an acid catalyzed ultraviolet light curable epoxy silicone composition applied on said continuous coating of a weak acid and pressure sensitive adhesive in direct contact with said silicone release coating.

2. An adhesive release system as defined in claim 1 wherein said substrate is selected from the group consisting of supercalendered kraft paper and machine refined paper; said weak acid is acetic acid; said silicone release composition is an epoxy functional organopolysiloxane having units of the formula $$R_a R_b^1 SiO_{(4-a-b)/2}$$

wherein R is hydrogen, aryl or aryl or $C_{1-8}$ alkyl, $R^1$ is a monovalent epoxy functional organic radical of from 2 to 20 carbon atoms, a is 0, 1 or 2; b is 1, 2 or 3; and a photocatalyst selected from the group consisting of halonium photocatalysts, sulfonium photocatalysts, phosphonium photocatalysts and mixtures thereof; and said pressure sensitive adhesive is an acrylic adhesive.

* * * * *